United States Patent [19]

Lahoda

[11] 4,243,645
[45] Jan. 6, 1981

[54] ALL DRY SOLID POTASSIUM SEED REGENERATION SYSTEM FOR MAGNETOHYDRODYNAMIC POWER GENERATION PLANT

[75] Inventor: Edward J. Lahoda, Edgewood, Pa.

[73] Assignee: Westinghouse Electric Corp., Pittsburgh, Pa.

[21] Appl. No.: 77,802

[22] Filed: Sep. 21, 1979

[51] Int. Cl.³ .................... C01D 7/00; C01B 7/00; G21D 7/02
[52] U.S. Cl. ...................... 423/428; 310/11; 423/561 A; 423/566; 423/563; 423/573 R
[58] Field of Search ............. 423/542, 421, 423, , 423/428, 431, 561 A, 566, 168, 208, 563, 573, 283, 286; 310/11

[56] References Cited

U.S. PATENT DOCUMENTS

| 1,045,769 | 11/1912 | Bollo et al. | 423/566 |
|---|---|---|---|
| 1,560,900 | 11/1925 | Drewsen | 423/428 |
| 1,565,300 | 12/1925 | White | 423/566 |
| 2,383,247 | 8/1945 | Gardner | 423/428 |
| 3,127,237 | 3/1964 | Markant | 423/428 |
| 3,401,010 | 9/1968 | Guerrieri | 423/428 |
| 3,867,514 | 2/1975 | Moore | 423/428 |

OTHER PUBLICATIONS

Feldmann et al., Kinetics of Recovering Sulfur from the Spent Seed in a Magnetohydrodynamic (MHD) Power Plant, Environmental Science & Technology, vol. 4, Jun. 20, pp. 496–502.

Sheth et al., Evaluation of Available Seed Reseneration Processes from Energy Considerations, Argonne National Laboratory, Chemical Engineering Division, Argonne, Ill., dtd. Mar. 1978.

Primary Examiner—O. R. Vertiz
Assistant Examiner—Gary P. Straub
Attorney, Agent, or Firm—R. D. Fuerle

[57] ABSTRACT

In a magnetohydrodynamic power plant where calcium carbonate seed is used to increase conductivity and scavenge sulfur, forming potassium sulfate, an improved process is disclosed for converting the potassium sulfate back into potassium carbonate for reuse in the power plant. The potassium sulfate is first reacted with a reducing agent in the presence of up to about 40% boric oxide at about 800° to about 1300° C. for at least about one hour to produce potassium sulfide. The potassium sulfide is then reacted with carbon dioxide and steam at about 450° to about 750° C. for at least about an hour to produce hydrogen sulfide and potassium carbonate. Finally, the potassium carbonate and the hydrogen sulfide are separated and the potassium carbonate is recycled.

10 Claims, 2 Drawing Figures

FIG. I

ALL DRY SOLID POTASSIUM SEED REGENERATION SYSTEM FOR MAGNETOHYDRODYNAMIC POWER GENERATION PLANT

BACKGROUND OF THE INVENTION

In a magnetohydrodynamic (MHD) power generation plant a fuel such as coal is burned at a very high temperature to provide a rapidly moving stream of hot ionized gas. The ionized gas passes between magnets which induces a current in electrodes on either side of the stream of gas. In order to increase the efficiency of the process, a seed such as potassium carbonate is injected into the gas stream to increase its conductivity. The use of potassium carbonate has the additional advantage of scavenging sulfur in the gas to form potassium sulfate, thereby removing a potential pollutant from the exhaust gases.

Because potassium carbonate is expensive and large quantities of it must be used, it is necessary to recover the potassium sulfate and convert it back into potassium carbonate for reuse in the MHD power plant. One process for doing this is the Argonne National Laboratory process, which has two steps. In the first step the potassium sulfate and oil are reacted to produce potassium sulfide and carbon dioxide. In the second step the potassium sulfide is reacted with water and carbon dioxide to produce potassium carbonate and hydrogen sulfide. This second step is an all-wet process because the water used is a liquid. Because liquid water is used, energy must be expended to thoroughly dry out the resulting potassium carbonate salt because the hydrogen present in water uses up electrons in the hot ionized gas and reduces the efficiency of the MHD generation process.

Another process for converting potassium sulfate to potassium carbonate is known as the PERC process. In the PERC process the potassium sulfate is reacted with hydrogen and carbon monoxide to produce potassium sulfide, water, and carbon dioxide. In the second step the potassium sulfide is reacted with water and carbon dioxide to produce potassium carbonate and hydrogen sulfide. The first step in the PERC process is expensive because the generation of the hydrogen and carbon monoxide is expensive. Also, the first reaction is very slow because the potassium sulfate is a solid and the gases that react with it must diffuse into it.

SUMMARY OF THE INVENTION

I have discovered a process for converting potassium sulfate into potassium carbonate which avoids the difficulties encountered with the Argonne National Laboratory and PERC processes. In my process, a molten mixture is used and no liquid water is present, thus avoiding the expense of drying out the resulting salt. Also, in my process it is not necessary to generate hydrogen and carbon monoxide and diffuse them into solid reactants. The process time is therefore shorter because an increased conversion is obtained for the same resonance time. This means that smaller and less expensive equipment can be used, thus reducing the capital investment and decreasing the energy loss from the equipment.

In my process the potassium sulfate is first reduced to potassium sulfide in the presence of up to about 40% boric oxide, and the potassium sulfide is then reacted with carbon dioxide and steam to produce hydrogen sulfide and the potassium carbonate seed. The seed is then separated from the hydrogen sulfide.

PRIOR ART

The Argonne National Laboratory process of converting potassium sulfate into potassium carbonate is described in a report by A. Sheth and T. R. Johnson, dated March, 1978, titled "Evaluation of Available Seed Regeneration Processes from Energy Considerations," published by Argonne National Laboratory, Chemical Engineering Division, Argonne, Illinois 60439. In the Argonne process potassium sulfate is is reacted with oil to form potassium sulfide and carbon dioxide. The potassium is then reacted with water and carbon dioxide to form hydrogen sulfide and potassium carbonate.

The PERC process is described in an article titled "Kinetics of Recovering Sulfur from the Spent Seed in a Magnetohydrodynamic (MHD) Power Plant," from *Environmental Science and Technology*, Vol. 4, June 1970, pages 476–502, by H. F. Feldman et al. In the PERC process potassium sulfate is reacted with hydrogen and carbon monoxide to produce potassium sulfide, water, and carbon dioxide. The potassium sulfide is then reacted with water and carbon dioxide to produce potassium carbonate and hydrogen sulfide.

DESCRIPTION OF THE INVENTION

Figure 1:
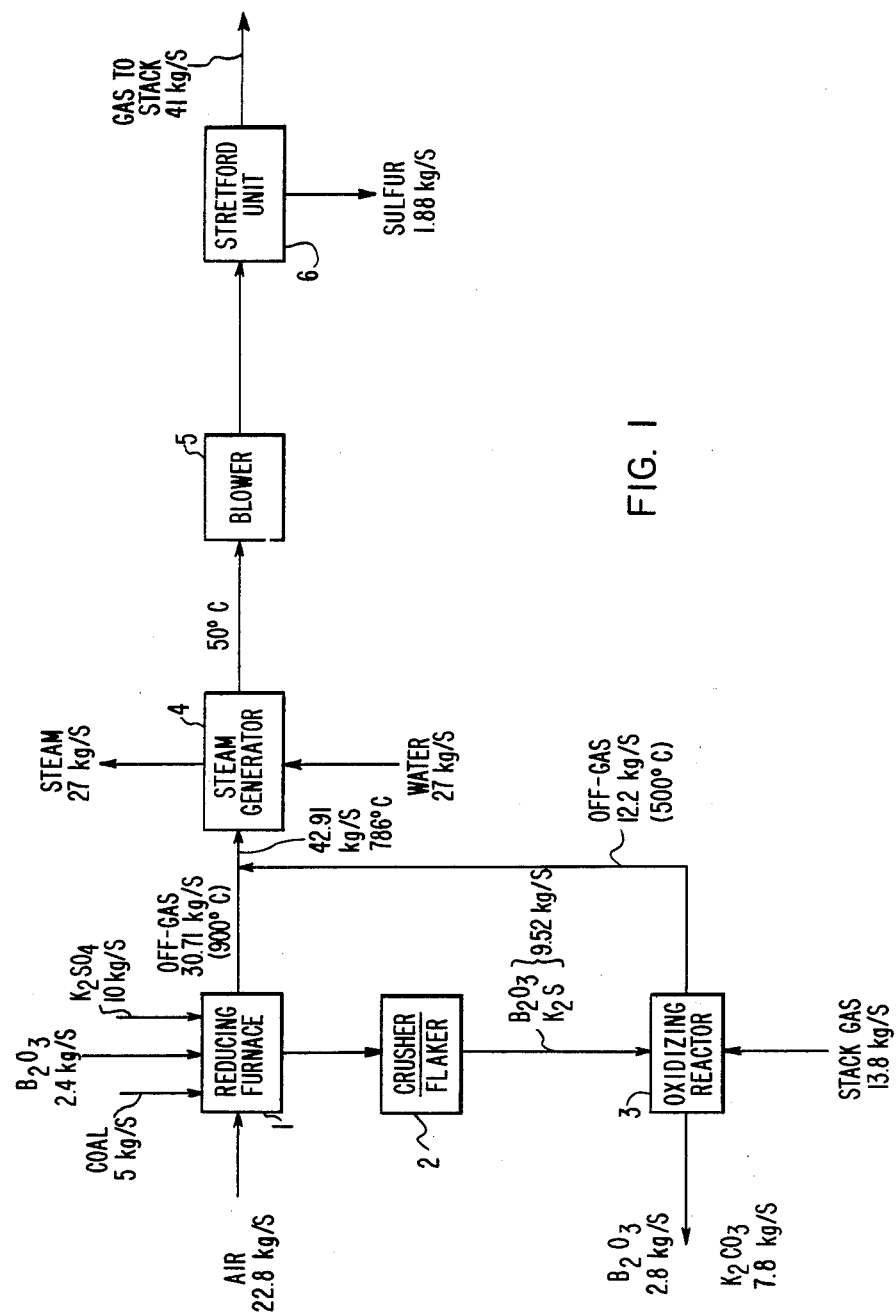
FIG. 1 is a block diagram illustrating the process of this invention.

The common fuels used in the MHD process are coal, oil, and gas. Coal is the preferred fuel as it is then least expensive. The coal is commonly crushed to less than 15 mesh particle size to ensure rapid combustion. About 1% by weight of the total MHD flow is made up of the potassium seed which is used to increase the conductivity of the flow and therefore the efficiency of the process. Potassium carbonate ($K_2CO_3$) is the preferred seed because in addition to increasing conductivity of the flow, it scavenges sulfur by forming potassium sulfate ($K_2SO_4$). This means that fuels high in sulfur can be used in the MHD process and the sulfur is not emitted into the air as a pollutant. The potassium sulfate produced in the MHD process is recovered and converted back into potassium carbonate.

In the first step of the process of this invention the potassium sulfate formed in the MHD process is reacted with a reducing agent to produce potassium sulfide carbon dioxide, and water. The reducing agent may be coke, coal, oil or natural gas, but is preferably coal as it is less expensive. The coal and the potassium sulfate should both be finely ground to facilitate reaction, preferably to a particle size of less than about 15 mesh. The reaction should take place at at least 800° C. because at lower temperatures the potassium sulfide eutectic with potassium sulfate is not formed. A temperature of over 1300° C., however, is unnecessary and may vaporize the potassium sulfate. A preferred temperature range is about 800° to about 1000° C. as there are less energy losses in this range and less thermal stress on the reactor materials. These temperatures can be reached by using excess coal and adding air to burn the excess coal. The reaction should be permitted to proceed for at least one hour to ensure an efficient conversion.

I have found that a dramatic increase in the conversion of potassium sulfate to potassium sulfide can be obtained by the addition of boric oxide ($B_2O_3$) to the reaction. The boric oxide acts as a catalyst and can be recovered with the potassium sulfide. Boric oxide seems to be the only suitable catalyst for this reason because it is inactive and low-melting, and does not form a high-melting eutectic with the other substances which are present. The amount of boric oxide used may range from 0.1% up to about 40% by weight, based on original solids, that is, on the reducing agent plus the potassium sulfate plus the boric oxide. More than 40% seems to dilute the reaction. The preferred amount is about 20 to about 30%. The boric oxide eventually is intermixed with the potassium carbonate product produced in the second reaction. However, no separation is necessary and it can pass through the MHD process with no ill effects.

In the second reaction of the invention the potassium sulfide formed in the first reaction is reacted with carbon dioxide and water to form potassium carbonate and hydrogen sulfide, according to the equation:

$$K_2S + CO_2 + H_2O \rightarrow K_2CO_3 + H_2S$$

This reaction is conducted at about 400° to about 750° C. At temperatures less than 450° C. the equilibrium is more to the right, but the reaction rate is too slow. At temperatures over 750° C., reaction rates are faster but the equilibrium is toward the left. The preferred temperature range is about 500° to about 600° C. This reaction should also be conducted for at least one hour to ensure an efficient conversion to potassium carbonate.

Finally, the hydrogen sulfide gas is permitted to separate from the solid potassium carbonate and the hydrogen sulfide is converted to sulfur. The conversion of the hydrogen sulfide gas to sulfur may be accomplished, for example, using the Stretford process or the Clauss process.

FIG. 1 illustrates the approximate quantities per second, which would be needed to process 10 kilograms per second of potassium sulfate. In the drawing, air at about 22.8 kilograms per second, pulverized coal at about 5 kilograms per second, boric oxide at about 2.4 kilograms per second, and 10 kilograms per second of potassium sulfate are admitted to reducing furnace 1, where the first reaction in the process of this invention occurs. The solids formed from the first reaction, boric oxide and potassium sulfide, pass to crusher/flaker 2 where their particle size is preferably reduced to less than about 15 mesh. This quantity of solids, about 9.52 kilograms per second, then passes to oxidizing reactor 3 where the second reaction occurs. In the oxidizing reactor, stack gas, a mixture of water and carbon dioxide is about 13.8 kilograms per second, is reacted with the potassium sulfide to form about 8.33 kilograms per second of potassium carbonate and about 2.8 kilograms per second of boric oxide, which are recirculated to the MHD power generation system. The off gas formed, principally hydrogen sulfide and unreacted steam and carbon dioxide at a rate of about 12.2 kilograms per second, is at a temperature of about 500° C. and is mixed with the off gas from the first reaction about 30.71 kilograms per second at 900° C. and passes to steam generator 4 where the heat of these gases is used to boil water which generates electricity. The loss of heat in the gases reduces their temperature to about 50° C. and they pass to blower 5 which provides the suction necessary to pull them through the system. The gases are then forced into Stretford unit 6 which reduces the hydrogen sulfide to solid sulfur at about 1.88 kilograms per second.

The process of this invention may also be useful in regenerating alkali solutions used in $SO_2$ scrubbers.

The following example further illustrates this invention.

EXAMPLE

Figure 2:
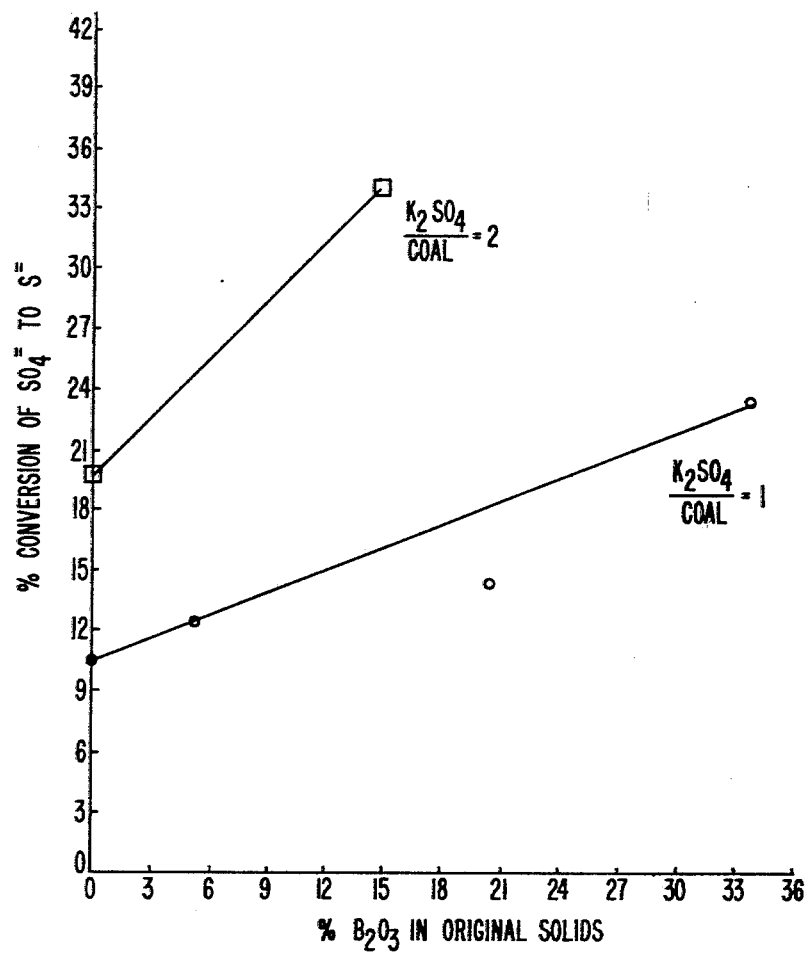
FIG. 2 is a graph which illustrates the results obtained in the Example.

Potassium sulfate was mixed with pulverized Pittsburgh bituminous coal in two batches, one having a ratio of potassium sulfate to coal of 2, and the other having a ratio of potassium sulfate to coal of 1. Samples of each batch were taken and various percentages of boric oxide were mixed in. The samples were placed in a molybdenum boat and heated in a tubular electrical furnace for one hour at 900° C. The samples were then analyzed for sulfide and sulfate to determine the percent conversion of potassium sulfate to potassium sulfide. FIG. 2 gives the results of these experiments and shows the increased conversion with resulted from using boric oxide.

I claim:

1. A process for converting $K_2SO_4$ into $K_2CO_3$ comprising:
   (A) reacting said $K_2SO_4$ with a reducing agent in the presence of 0.1% to about 40% $B_2O_3$ at about 800° to about 1300° C. for at least about one hour to produce $K_2S$;
   (B) reacting said $K_2S$ with carbon dioxide and steam at about 450° to about 750° C. for at least about one hour to produce hydrogen sulfide and said $K_2CO_3$; and,
   (C) separating said $K_2CO_3$ and said hydrogen sulfide.

2. A process according to claim 1 wherein said reaction of $K_2SO_4$ with a reducing agent is at about 800° to about 1000° C., and said reaction of $K_2S$ with carbon dioxide and steam is at about 500° to about 600° C.

3. A process according to claim 1 wherein said reducing agent is coal.

4. A process according to claim 3 wherein excess coal is used and air is injected to burn said excess coal to provide heat for the reaction.

5. A process according to claim 3 wherein said coal is crushed to a particle size of less than 15 mesh.

6. A process according to claim 1 wherein the amount of $B_2O_3$ is about 20 to about 30%.

7. A process according to claim 1 wherein said $CO_2$ and steam are obtained from flue gas.

8. A process according to claim 1 wherein said hydrogen sulfide is converted to sulfur by means of a Stretford unit.

9. A process according to claim 1 wherein said hydrogen sulfide is converted to sulfur by means of a Clauss unit.

10. A process according to claim 1 wherein said $K_2SO_4$ is spent seed from a magnetohydrodynamic power plant, and said $K_2CO_3$ is recycled to said plant as seed and to scavenge sulfur.

* * * * *